United States Patent
Trani et al.

(10) Patent No.: US 8,518,522 B2
(45) Date of Patent: Aug. 27, 2013

(54) MULTILAYER PAPER MATERIAL METHOD FOR ITS FORMING AND METHOD FOR OBTAINING THREE-DIMENSIONAL CONTAINERS

(75) Inventors: Giorgio Trani, Venice (IT); Marion Sterner, Venice (IT); Leonardo Andreotti, Ferrara (IT); Marco Scatto, Milan (IT)

(73) Assignee: Giorgio Trani, Venice (IT)

( * ) Notice: Subject to any disclaimer, the term of this patent is extended or adjusted under 35 U.S.C. 154(b) by 83 days.

(21) Appl. No.: 12/866,190

(22) PCT Filed: Feb. 13, 2009

(86) PCT No.: PCT/IB2009/000271
§ 371 (c)(1),
(2), (4) Date: Aug. 4, 2010

(87) PCT Pub. No.: WO2009/101526
PCT Pub. Date: Aug. 20, 2009

(65) Prior Publication Data
US 2011/0014433 A1  Jan. 20, 2011

(30) Foreign Application Priority Data
Feb. 14, 2008 (IT) .............................. VE2008A0011

(51) Int. Cl.
*D06N 7/04* (2006.01)
*B32B 3/28* (2006.01)
*B32B 3/30* (2006.01)

(52) U.S. Cl.
USPC ............ 428/179; 428/153; 428/154; 428/182

(58) Field of Classification Search
USPC ................. 428/153, 154, 166, 181, 182, 183, 428/184, 185, 186, 179; 229/939
See application file for complete search history.

(56) References Cited

U.S. PATENT DOCUMENTS
2004/0076798 A1* 4/2004 Larsson et al. ................ 428/153
2007/0262129 A1   11/2007 Zadravetz FOREIGN PATENT DOCUMENTS
| | | |
|---|---|---|
| DE | 10134819 | 11/2002 |
| EP | 0020001 | 12/1980 |
| FR | 804234 | 10/1936 |
| FR | 1605272 | 1/1974 |
| GB | 1218671 | 1/1971 |
| GB | 2332873 | 7/1999 |

* cited by examiner

*Primary Examiner* — Catherine A Simone
(74) *Attorney, Agent, or Firm* — Themis Law

(57) ABSTRACT

A multilayer papery material comprising at least one first sheet of three-dimensional structure and at least one second sheet fixedly coupled to the first sheet and defining empty spaces therein, wherein at least said second sheet is made of a papery material having a degree of extensibility of not less than 5% in all directions.

11 Claims, 3 Drawing Sheets

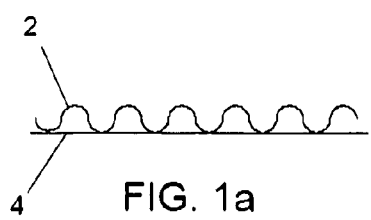
FIG. 1a
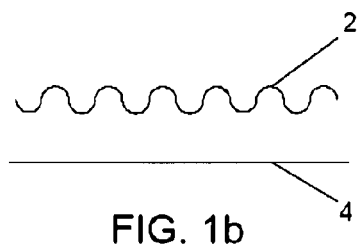
FIG. 1b
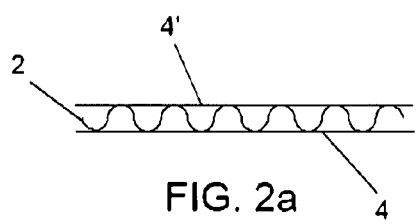
FIG. 2a
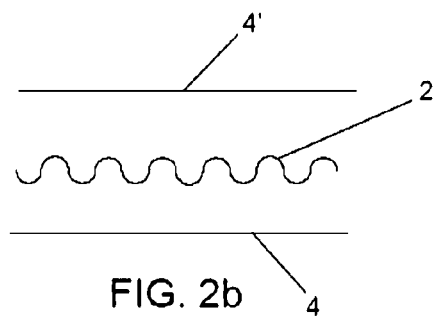
FIG. 2b
FIG. 3
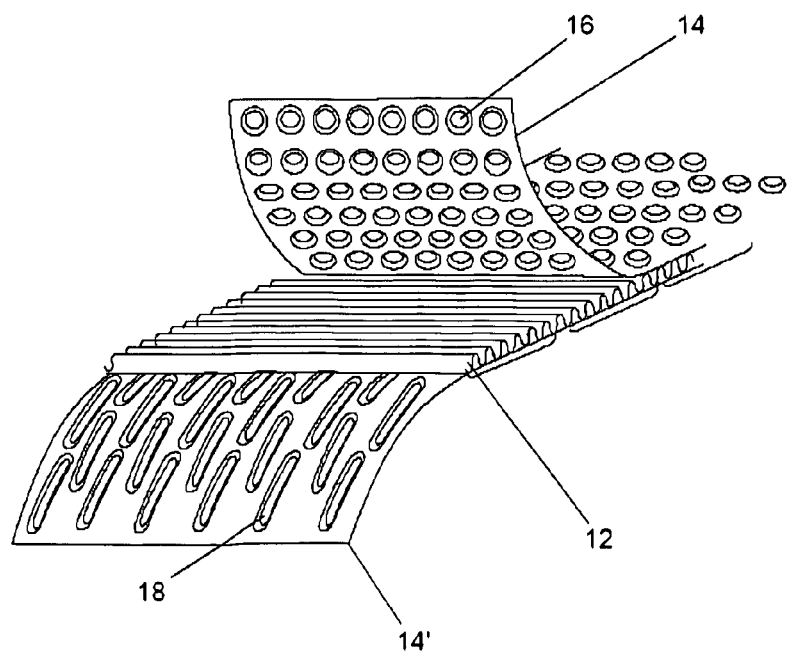

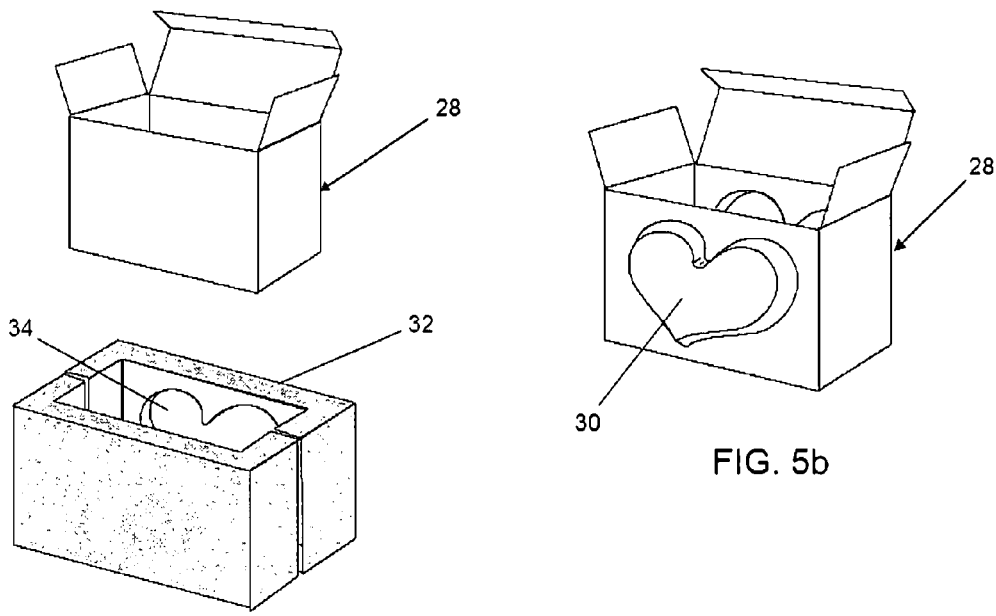
FIG. 5a
FIG. 5b
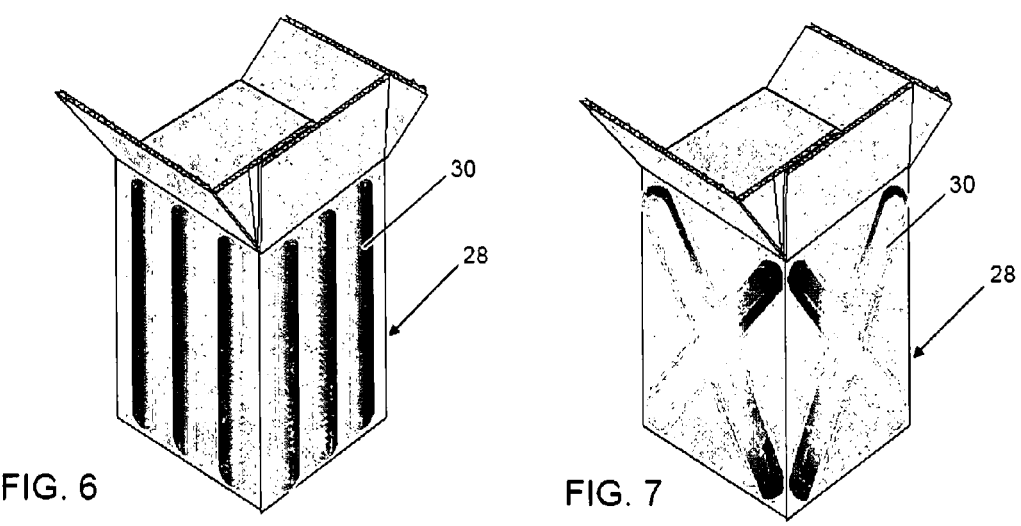
FIG. 6
FIG. 7

_US 8,518,522 B2_

MULTILAYER PAPER MATERIAL METHOD FOR ITS FORMING AND METHOD FOR OBTAINING THREE-DIMENSIONAL CONTAINERS

FIELD OF THE INVENTION

The present invention relates to a multilayer papery material, a method for its preparation, and a method for producing three-dimensional containers.

BACKGROUND OF THE INVENTION

Multilayer papery materials are known, and in particular so-called "corrugated cardboard", which comprises a sheet of corrugated paper, i.e. shaped to present a continuous succession of waves, and a flat paper sheet glued to the corrugated paper sheet along its crests. Two flat paper sheets can also be glued, one onto each side.

Whether it presents one, two or more flat sheets, the known corrugated cardboard is mainly used in the technical packaging sector, in which the function of the corrugated paper layer is to protect the packaged products, while the function of the flat sheet or sheets is to stiffen the corrugated paper layer and to form a support for the printing.

In known methods for producing the corrugated paper layer the wave crests are always transverse to the machine direction, i.e. perpendicular to the advancement direction of the paper web forming the corrugated layer. Because of this, the known corrugated cardboard has greater rigidity to bending in the transverse direction and lesser rigidity to bending in the longitudinal direction.

In addition to being used for wrapping the most varied products, the known corrugated cardboard is also used to form boxes and containers in general, to hold the articles to be packaged, these not necessarily being the same shape as the container, hence their poor bending rigidity in the longitudinal direction gives rise to the difficulty of producing sufficiently rigid containers.

To reduce this problem, it has previously been proposed to increase the number of corrugated paper layers, hence substantially increasing the weight and cost of the packaging.

SUMMARY OF THE INVENTION

An object of the invention is to provide a multilayer papery material which presents high rigidity to bending in all directions.

Another object of the invention is to provide a multilayer papery material on which, in contrast to traditional corrugated containers, writing can be printed or decorations be applied in relief.

These and other objects which will be apparent from the ensuing description are attained according to the invention by a multilayer papery material comprising at least one first three dimensional structure sheet exhibiting reliefs having maximum sizes which are lower than the width of the original sheet, said reliefs being obtained through localized stretching of said first sheet which has an original degree of extensibility of not less than 5% in all the directions, and at least one second sheet made of papery material coupled to said first structure sheet and defining empty spaces with the reliefs thereof.

BRIEF DESCRIPTION OF THE DRAWINGS

Some preferred embodiments of the present invention are further clarified hereinafter with reference to the accompanying drawings, in which:

FIG. 1a is a schematic section through the papery material according to the invention, FIG. 1b shows it in exploded schematic section, FIG. 2a shows a second embodiment thereof in schematic section, FIG. 2b shows it in exploded schematic section, FIG. 3 is a partially opened partial perspective view of a third embodiment thereof, FIG. 5a is an exploded perspective view of a parallelepiped container obtained from a multilayer papery material, to be subjected to deformation by stretch-forming within a mould, FIG. 5b shows the container produced, FIG. 6 is a perspective view of a parallelepiped container, likewise obtained from the papery material of the invention and presenting on its lateral faces a different ornamental relief motif, and FIG. 7 shows the same container as FIG. 6, but presenting on its lateral faces yet a different ornamental relief motif.

DETAILED DESCRIPTION OF EMBODIMENTS OF THE INVENTION

Figure 4A:
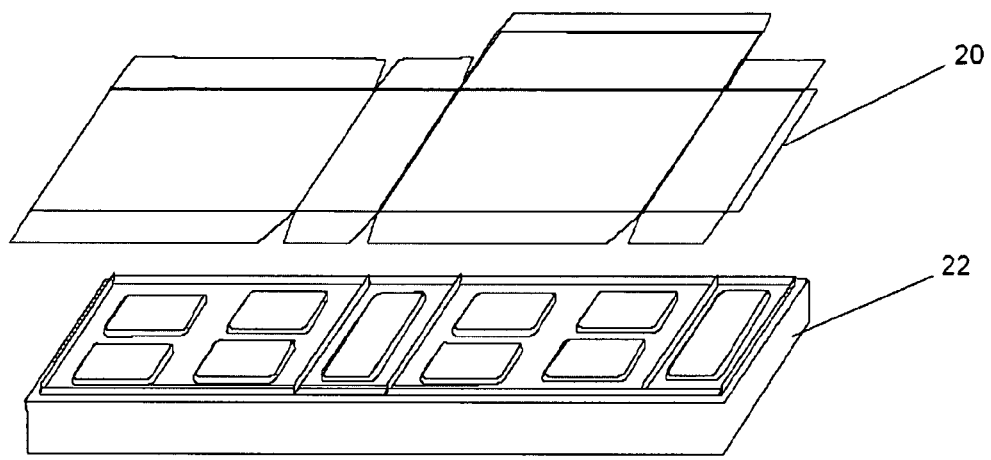
FIG. 4a is an exploded perspective view of a punched sheet of multilayer material with which a parallelepiped container is to be formed, together with the flat mould for its deformation by stretch-forming.

As it can be seen from the figures, in the embodiment shown in FIG. 1 the multilayer material of the invention consists of two layers 2, 4 of paper presenting extensibility characteristics of not less than 5% both in a longitudinal and in a transverse direction, and preferably not less than 15%.

The longitudinal direction means that direction along the axis of the continuous paper web leaving the paper machine, while the transverse direction means a direction perpendicular to the preceding direction.

The first paper layer 2 presents a succession of transverse waves and is produced by traditional corrugated cardboard production methods, i.e. using a corrugator, which bends the continuous web of papery material before being glued onto the second paper layer 4, which is instead maintained taut and acts as the support.

Alternatively, the single paper sheet 4 acting as the support could be made of extensible material while the corrugated paper sheet 2 is instead maintained normal, i.e. is substantially without extensibility characteristics, except for its intrinsic extensibility which each paper sheet possesses.

In the embodiment of FIGS. 2a and 2b, the multilayer material differs from that shown in FIGS. 1a and 1b in that the corrugated layer 2 lies between two flat paper layers 4 and 4, both presenting both longitudinal and transverse extensibility characteristics of not less than 5% and preferably not less than 15%.

Depending on its particular use, the sheet 4 and possibly the sheet 4' can be coupled to further protective layers which need not be papery, but be likewise extensible, to provide the multilayer material with special characteristics, such as impermeability, bondability, printability, etc.

The embodiment shown in FIG. 3 shows three sheet paper layers 12, 14 and 14', of which the intermediate layer 12 is a transversely corrugated paper layer, not necessarily extensible, while the two outer layers 14 and 14' are of extensible paper and before being glued to the intermediate layer 12 are subjected to plastic deformation treatment, which utilizes the extensibility characteristics of the paper to form therein a series of reliefs of different shapes on the basis of the use for which the multilayer papery material is intended.

Specifically, the outer sheet 14 comprises a plurality of circular reliefs 16, the function of which is essentially to increase the anti-impact characteristics which the intermediate layer 12 already gives to the multilayer and which prove particularly useful in using the material in the packaging sector.

The outer sheet 14' presents instead a plurality of rectilinear reliefs 18 disposed perpendicular to the corrugations of the intermediate layer 12 and having the double function of further increasing the anti-impact characteristics of the multilayer material, due to the corrugations of the intermediate layer 12 and to the circular reliefs 16 of the outer layer 14, and of integrating the rigidity to longitudinal bending with the rigidity to transverse bending given by the transverse corrugations of the intermediate layer 12.

It should be noted that while the transverse corrugations of the intermediate layer 12 extend for the entire sheet width and can be produced by corrugation techniques which do not necessarily require the use of extensible paper, the circular reliefs 16 of the layer 14 and the longitudinal reliefs 18 of the layer 14' extend only for part of the width of the relative sheet and are produced by advantageously utilizing the extensibility characteristics of the paper forming the sheet.

From the production viewpoint the continuous sheets 14 and 14' are subjected, prior to their gluing to the intermediate layer 12, to traditional stretch-forming operations achieved for example by passing the extensible paper sheet between pairs of rollers having in their lateral surface mutually penetrating cavities and complementary reliefs, or by other traditional methods comprising deformation by punches, by compressed air, by mixed techniques, etc.

The multilayer papery material of the invention can be advantageously used in the packaging sector for wrapping articles of any type and shape, to assume in this case a shape more or less approximately corresponding to that of the article itself.

The multilayer papery material can also be used to form containers having an actual shape, made stable by the rigidity of the material to bending. This rigidity can also be positively used during the making of the container and during the use of the container when filling. During these stages, which are generally effected by machine, the multilayer cardboard sheet, possibly punched, folded and glued to form a flattened container, is withdrawn by a traditional automatic packaging machine which, to open it, to position it correctly in front of the filling station and then to close it, subjects it to a series of stresses of extremely variable type and extent, such that by being made from a substantially indeformable material able to react to every type of stress, the packaging machine is able to operate thereon under more driven conditions in terms of rate, reliability and type of stresses.

If however the containers formed from the multilayer papery material of the invention are not to be folded flat while awaiting make-up, to be then opened up, but are already shaped in their final form for use, the invention enables suitable stacking shapes to be studied, which because of the container indeformability allow easier stacking and likewise easy destacking.

Finally according to the invention, the entire multilayer can be deformed instead of the individual layers, by utilizing the extensibility characteristics of its constituent layers. This can be achieved by subjecting the multilayer web to stretching after its formation, but before the container is made, or on the already made container.

Figure 4B:
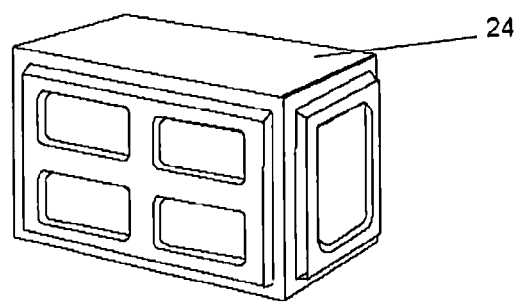
FIG. 4b is a perspective view of the container produced.

FIGS. 4a and 4b show two steps in the method for forming a parallelepiped container obtained from a multilayer papery material according to the invention. In particular, FIG. 4a shows upperly a sheet of multilayer material 20 punched and crease-lined, and lowerly a flat mould on which the sheet is deformed by stretch-forming by traditional techniques before being folded and glued to form the parallelepiped container 24 shown in FIG. 4b, and with its lateral walls comprising ornamental relief motifs.

FIGS. 5a and 5b show two steps of a different method for forming a parallelepiped container having on two opposing vertical walls a different ornamental motif 30. The method comprises firstly forming the parallelepiped container 28 by traditional punching, crease lining, folding and gluing techniques, and then inserting it into the equal-dimensioned parallelepiped cavity of a mould 32, in which the two walls corresponding to the walls of the container 28 to be decorated comprise a depression 34 corresponding to the relief motif 30. Compressed air is then fed into the container 28 inserted in the mould 32, to thrust the wall portions into the mould depressions, to create the ornamental relief motif by stretch-forming.

By varying the shape and position of the depressions 34 provided in the mould 32, the shape and arrangement of the obtained reliefs 30 on the container vary, FIGS. 6 and 7 showing two parallelepiped containers 28 comprising different structural motifs on its lateral walls, to provide a substantially increased rigidity with a smaller quantity of papery material.

The container also has the advantage of a greater containment volume for equal material used, and provides a shock absorption function.

The invention claimed is:

1. A multilayer papery material comprising:
   at least one first three dimensional structure sheet exhibiting reliefs having maximum sizes which are lower than a width of an original sheet, said reliefs being obtained through localized stretching of said first sheet which has an original degree of extensibility of not less than 5% in all directions;
   at least one second sheet made of papery material and defining empty spaces corresponding to the reliefs on said first structure sheet, wherein said second sheet has a degree of extensibility of not less than 5% in all directions, and wherein said second sheet comprises a plurality of reliefs; and
   a third sheet having corrugations extending along a width of said third sheet, said third sheet being interposed between said first sheet and said second sheet and being glued to said first sheet and second sheet.

2. The multilayer papery material of claim 1, wherein said second sheet has a degree of extensibility of not less than 15% in all directions.

3. The multilayer papery material of claim 1, wherein a layer of protective material is coupled to said second sheet.

4. The multilayer papery material of claim 1, wherein the reliefs on at least one of said first or second sheets are rectilinear and disposed perpendicularly to said corrugations.

5. The multilayer papery material of claim 1, wherein said first sheet comprises a papery material having a degree of extensibility of not less than 15% in all directions.

6. The multilayer papery material of claim 1, wherein said second sheet comprises a plurality of elongate reliefs extending in a longitudinal direction.

7. A method of forming a multilayer papery material according to claim 1, comprising:
   subjecting a first sheet of papery material, presenting extensibility characteristics of not less than 5% in all directions, to localized stretching deformation to give said first sheet a three-dimensional structure;

providing a second sheet of papery material having a degree of extensibility of not less than 5% in all directions and a plurality of reliefs;

disposing a third sheet of corrugated paper between said first sheet and said second sheet, said corrugated paper having corrugations that extend along a width of said third sheet and coupling said first sheet with said second sheet and said third sheet by gluing said third sheet to said first sheet to said second sheet to form empty spaces therebetween.

8. A method of forming three-dimensional containers according to claim 7, further comprising:

subjecting said multilayer papery material in sequence to the steps of punching, crease-lining, folding and stabilizing in the folded configuration to form a three-dimensional container; and before or after any of said steps, subjecting the multilayer papery material to stretch-forming localized within those regions, in which ornamental relief motifs are to be created.

9. The method of claim 8, wherein the punched and crease-lined material is subjected to stretch-forming before folding and stabilizing in the form of a three-dimensional container.

10. The method of claim 9, wherein the punched and crease-lined material is subjected to stretch-forming in a flat mold comprising one or more of reliefs or cavities corresponding to the one or more of reliefs or cavities to be provided in a finished container.

11. The method of claim 9, wherein an already formed container is subjected to stretch-forming within a mold having a cavity substantially corresponding to an outer shape of said container and presenting, on those walls corresponding to walls of the formed container, cavities corresponding to the ornamental relief motifs to be obtained on the container.

* * * * *